United States Patent
Tokita et al.

[11] Patent Number: 5,901,029
[45] Date of Patent: May 4, 1999

[54] METHOD OF DEGAUSSING A COLOR CATHODE RAY TUBE

[75] Inventors: Kiyoshi Tokita, Hyogo-ken; Tetsuo Hasegawa, Fukaya; Masatsugu Inoue, Kumagaya; Kazunori Nakane, Saitama-ken, all of Japan

[73] Assignee: Kabushiki Kaisha Toshiba, Kawasaki, Japan

[21] Appl. No.: 08/842,787

[22] Filed: Apr. 16, 1997

Related U.S. Application Data

[63] Continuation of application No. 08/515,872, Aug. 16, 1995, abandoned, which is a continuation-in-part of application No. 08/171,982, Dec. 23, 1993, abandoned, which is a continuation of application No. 07/682,411, Apr. 8, 1991, abandoned, which is a continuation of application No. 07/329,399, Mar. 27, 1989, abandoned.

[30]  Foreign Application Priority Data

Mar. 28, 1988 [JP] Japan ...................................... 63-71841

[51] Int. Cl.$^6$ .............................. H01F 13/00; H04N 9/29
[52] U.S. Cl. .......................................... 361/150; 361/267
[58] Field of Search .................... 361/149, 150; 315/267, 8; 335/284; 324/404

[56]  References Cited

U.S. PATENT DOCUMENTS

| | | |
|---|---|---|
| 2,764,628 | 9/1956 | Bambara . |
| 3,340,443 | 9/1967 | Rieth et al. ............................. 361/150 |
| 3,369,201 | 2/1968 | Fiore et al. ............................. 324/404 |
| 3,439,211 | 4/1969 | Cassagne et al. ...................... 361/150 |
| 3,617,871 | 11/1971 | Rogus et al. ........................... 324/404 |
| 3,654,548 | 4/1972 | Pacorari et al. ........................ 324/404 |
| 4,441,052 | 4/1984 | Willis . |
| 4,458,178 | 7/1984 | Tenney et al. . |
| 4,535,270 | 8/1985 | Frantz et al. . |
| 4,580,078 | 4/1986 | Spannhake . |
| 4,689,525 | 8/1987 | Shimoma et al. . |
| 4,737,881 | 4/1988 | Haferl . |

FOREIGN PATENT DOCUMENTS

| | | |
|---|---|---|
| 219287 | 4/1987 | European Pat. Off. . |
| 89105129 | 11/1990 | European Pat. Off. . |
| 58-714 | 1/1983 | Japan . |
| 58-31689 | 2/1983 | Japan . |
| 1245689 | 9/1989 | Japan . |
| 1499663 | 2/1978 | United Kingdom . |

OTHER PUBLICATIONS

Kuredjian, George Z., "Basic Television an dVideo Systems," book, 5th Ed., Inter'l. Ed., McGraw–Hill Book Co., 1984, Singapore, pp. 107–108.

*Primary Examiner*—Fritz Fleming
*Attorney, Agent, or Firm*—Pillsbury Madison & Sutro LLP

[57]  ABSTRACT

In a method of testing a color cathode ray tube, an electron gun assembly is energized to emit electron beams and only a horizontal deflection magnetic field is applied to the electron beams so that a line image is displayed on a screen. A degaussing coil is located in front of the panel and a degaussing magnetic field having a frequency the same as that of a commercial power source. Thereafter, the degaussing coil is moved in a direction away from the panel and is deenergized when the coil is removed from the panel at a predetermined distance. A vertical deflecting coil is energized to display an image and a picture quality of the tube is tested.

3 Claims, 4 Drawing Sheets

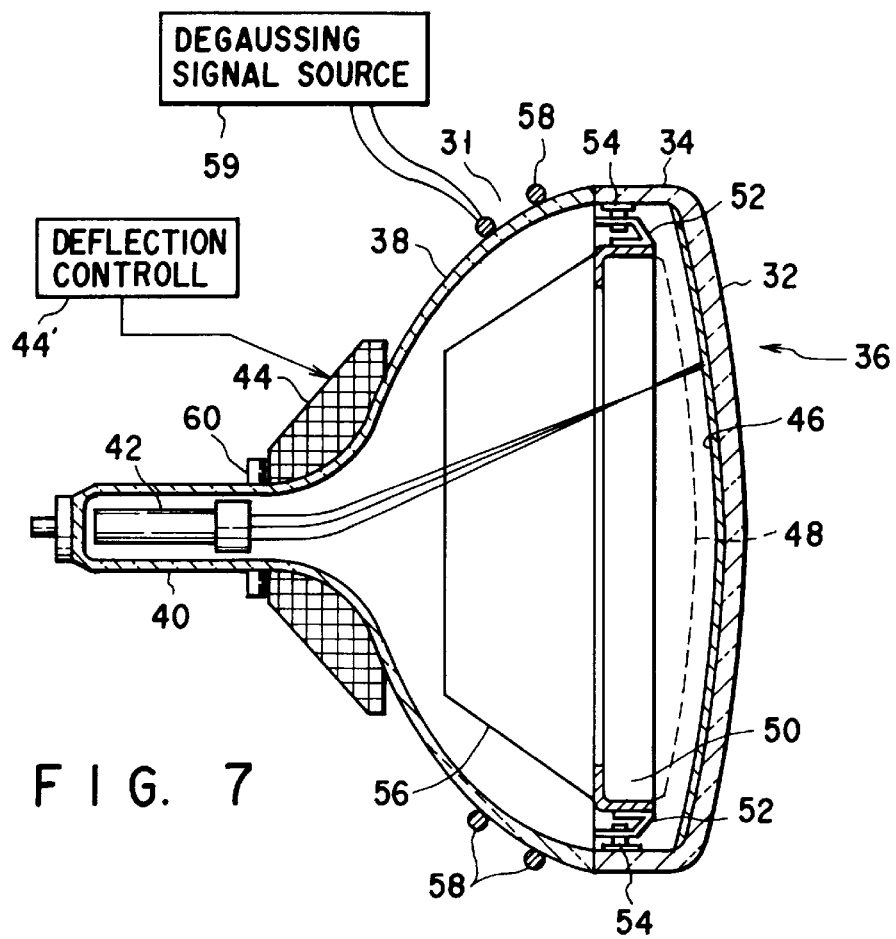

METHOD OF DEGAUSSING A COLOR CATHODE RAY TUBE

CROSS-REFERENCES TO THE RELATED APPLICATIONS

This is a continuation of application Ser. No. 08/515,872, filed on Aug. 16, 1995, which was abandoned upon the filing hereof which in turn is a continuation-in part of U.S. application Ser. No. 08/171,982, filed Dec. 23, 1993, (abandoned), which in turn is a continuation application of application Ser. No. 07/682,411, filed Apr. 8, 1991, (abandoned), which in turn is a continuation application of application Ser. No. 07/329,399, filed Mar. 27, 1989 (abandoned).

BACKGROUND OF THE INVENTION

1. Field of the Invention

The present invention relates to a method of manufacturing a color cathode ray tube and more particularly, it relates to method of degaussing the color cathode ray tube of the shadow mask type in a manufacturing step of the color cathode ray tube.

2. Description of the Related Art

The color cathode ray tube of the shadow mask type includes a panel section provided with a substantially rectangular face plate and a skirt projected backward from the face plate, a funnel section connected to the panel section, and a neck section continuous from the funnel section. These three sections maintain the interior of the color cathode ray tube as airtight closed and under vacuum. An electron gun assembly for generating electron beams is housed in the neck. A deflection yoke for generating magnetic field is located on the funnel and neck. A degaussing coil for degaussing magnetized parts or components of the tube is also located on the funnel. A phosphor screen is formed on the inner face of the face plate at the panel. A substantially rectangular shadow mask is arranged in the tube, facing the phosphor screen with a certain interval interposed relative to the face plate. The shadow mask is made by a thin metal plate and has a plurality of slits. A mask frame is located around the shadow mask. Plural mask supports, elastically deformable, are welded to the mask frame. Plural stud pins which are engaged with the mask supports are arranged on the inner face of the skirt at the panel section. An inner magnetic shield is attached to the mask frame on the side of the neck to prevent a magnetic field outside, such as earth magnetism, from acting on the electron beams emitted from the electron gun assembly.

In the case of the color cathode ray tube of the shadow mask type, the three electron beams emitted from the electron gun assembly are deflected in horizontal and vertical directions by magnetic field generated by the deflection yoke and then are converged upon the slits of the shadow mask. The electron beams converged upon the slits of the shadow mask land onto the phosphor screen of the face plate at the panel section. The phosphor screen has three kinds of fluorescent stripes which are alternately arranged to form the phosphor screen. When these fluorescent stripes are shot by the three electron beams passing through the slits of the shadow mask, they emit lights of three colors red, green and blue. In short, the slits of the shadow mask serve to direct the three electron beams to their corresponding fluorescent stripes which emit the lights rays of red, green and blue colors.

In the case of the color cathode ray tube, its shadow mask, mask frame, inner magnetic shield and the like are usually made of magnetic material such as low carbon steel. When they are magnetized by outside magnetism such as earth magnetism, therefore, their remnant magnetism shifts paths of the electron beams. When the paths of the electron beams are shifted in this manner, the electron beams cannot be landed correctly onto the phosphor screen. The color purity in the color cathode ray tube is thus reduced. This makes it necessary to demagnetize their remnant magnetism to prevent the color purity from being reduced.

Conventionally, magnetized parts or components of the color cathode ray tube are demagnetized by the degaussing coil in the following three cases.

1) When the property of a color cathode ray tube completed in the course of manufacturing color cathode ray tubes is tested.

2) When the performance of a completed television set in which the color cathode ray tube and other components have been incorporated in the course of manufacturing television sets is tested.

3) Whenever the television set which is in normal use is switched on.

In the case of testing the property of the color cathode ray tube, the color purity is measured as a point to evaluate the quality of image. This color purity is measured after remnant magnetism is degaussed according to the method which will be described later. In another case of incorporating the color cathode ray tube and other components to form the completed television set, remnant magnetism is demagnetized to color-adjust the color cathode ray tube.

U.S. Pat. No. 4,737,881 uses a resonance circuit to degauss the remnant magnetism of magnetic components. Frequency (f) of degaussing current flowing through the resonance circuit is denoted by $f=\frac{1}{2}\pi\sqrt{LC}$ wherein L represents inductance and C capacitance. The inductance of a degaussing coil used in this resonance circuit is several mH (millihenries) and the capacitance of a condenser is several uF (microfarads). The frequency of degaussing current flowing through the resonance circuit becomes several ten kHz, accordingly. Energy (E) of degaussing magnetic field is denoted by $E 2 \pi \sqrt{LC}=1/f$ and energy (E) is therefore inversely proportional to frequency. In other words, degaussing energy (E) becomes smaller and smaller as frequency (f) of degaussing current becomes higher and higher. When frequency (f) becomes high, therefore, magnetized components cannot be sufficiently degaussed by the degaussing means.

There is a well known resonance circuit which can oscillate at a frequency lower than 100 Hz. This resonance circuit needs a capacitor having a capacitance (C) of several F (farads) and a coil having inductance (L) of several H (Henries) to oscillate at the frequency lower than 100 Hz. This causes the resonance circuit to become larger in size than the common one used for the color cathode ray tube and its cost to become ten times that of the common one. Therefore, a resonance circuit is not practical.

When a resonance circuit which can oscillate at the frequency of several tens of kHz is used to demagnetize the remnant magnetism of parts of the color cathode ray tube, however, its degaussing energy is small because the frequency of its degaussing current is quite high. The magnetized parts cannot be sufficiently demagnetized by this resonance circuit, accordingly. When the frequency of a degaussing magnetic field is compared with that of a vertically deflecting magnetic field generated by the deflection yoke, the latter is lower than the former. When degaussing and vertically deflecting magnetic fields are applied to the magnetized components of the tube at the same time, therefore it becomes more difficult for the magnetized components to be demagnetized because energy of vertically deflecting magnetic field is higher than that of degaussing magnetic field. This makes it necessary to use a delay circuit intended to flow deflecting current after the magnetized components are demagnetized.

Moreover, magnetized parts of the color cathode ray tube are demagnetized by the degaussing coil supplied with the current whose frequency is the same as the commercial frequency. The frequency of the vertical deflection current is the same as the commercial frequency in most regions in the world. FIG. 1 shows how degaussing magnetic field 2 generated by the transient, attenuating A.C. current and deflection magnetic field 4 generated by the vertical deflection current change with time. As is shown in FIG. 1, degaussing magnetic field 2 and deflection magnetic field 4 have the same frequency. Degaussing magnetic field 2 is shown as being in phase with deflection magnetic field 4, but normally, degaussing magnetic field 2 is not generated in synchronism with deflection magnetic field 4. Therefore, when degaussing magnetic field 2 is applied for the degaussing of the color cathode ray tube, a phase shift is likely to occur between degaussing magnetic field 2 and deflection magnetic field 4. FIG. 2 shows magnetism flux density distribution 6 relating to the vertical deflection magnetic field generated when the deflection coil is supplied with a vertical deflection current. In FIG. 2, magnetic flux densities are plotted against the ordinate and distances measured from the neck are plotted against the abscissa. As is indicated by magnetism flux density distribution curve 6, the magnetic flux density is as high as 5 gauss even at position 8 where the end of the magnetic shield is located. Since, therefore, the degaussing magnetic field and the vertical deflection magnetic field are superimposed on each other in the location of the magnetic shield, a hysteresis loop of a magnetic member applied with both degaussing magnetic field 2 and deflection magnetic field 4 is not symmetric with reference to the origin, and the magnetic shield retains the magnetism arising from the above-mentioned phase shift, even after it is degaussed. FIG. 3 shows hysteresis loop 10 of the magnetic field. As is shown, hysteresis loop 10 of a magnetic member applied with both degaussing magnetic field 2 and deflection magnetic field 4 is transformed or shifted from normal hysteresis loop 12, which is indicated by the broken lines with the reference numeral of "12". Although, in FIG. 3, hysteresis loop 12 is rotation-symmetric with reference to the origin, hysteresis loop 10 is not. FIG. 4 shows a detailed hysteresis curve obtained when a magnetic material is degaussed by applying a degaussing magnetic field thereto. FIG. 5 shows a degaussing magnetic field generated when a degaussing current flows through the degaussing coil, and also shows a vertical deflection magnetic field generated when a vertical deflection current flows through the deflection yoke. The magnetic flux density and magnetic field strength at time a in FIG. 5 are indicated at point a in FIG. 4, and those at time c in FIG. 5 are indicated at point c in FIG. 4. Likewise, times b and d-h in FIG. 5 correspond to points b and d-h, respectively.

Otherwise, the magnetic flux density and the magnetic field strength at time a in FIG. 5 are indicated at point a' in FIG. 4 when the deflection yoke does not generate a vertical deflection magnetic field. Those at time c in FIG. 5 are indicated at point c' in FIG. 4 when the yoke does not generate the magnetic field. Likewise, times e,g in FIG. 5 correspond to points e', g', and times b, d, f and h in FIG. 5 correspond to proximate points (not shown) of points b, d, f and h respectively when the yoke does not generate the magnetic field. As a result, the hysteresis curve in FIG. 4 is shifted from a hysteresis curve (not shown) in the case of the magnetic shield applied with only degaussing magnetic field. Shift distance between point c and point c' is shorter than shift distance between point a and point a'.

Therefore, when magnetic shield is applied with both degaussing magnetic field 21 and vertical deflection magnetic field 22, its hysteresis curve 20 can be represented in the manner indicated in FIG. 4. Accordingly, magnetic field strength Hb at time b is greater than magnetic field strength Hd at time d since magnetic shield is applied with vertical deflection magnetic field 22. The decrease in quantity $\Delta Hd$ of magnetic field strength Hd is greater than the decrease quantity $\Delta Hb$ of magnetic field strength Hb. Therefore, hysteresis curve 20 is formed asymmetrically shown in FIG. 4. Moreover, the asymmetrical hysteresis curve is shifted in one direction during this degaussing since vertical deflection magnetic field 22 at points a, b, c and d in FIG. 5 are equal to magnetic field 22 at points e, f, g and h respectively. As a result of this degaussing, the hysteresis curve converges at point r in FIG. 4, and the remnant magnetism at converging point r in Br. In short, the remnant magnetism does not decrease to 0. Since, converging point r moves due to the phase difference between the degaussing magnetic field and the vertical deflection magnetic field, remnant magnetism Br varies accordingly.

FIG. 6 shows how the landing point of an electron beam is shifted from its initial landing point on the phosphor screen corner, wherein the initial landing point is obtained when the color cathode ray tube is degaussed at the first time by using the above-mentioned degaussing method, and the other landing point is obtained when the color cathode ray tube is also degaussed at the other time. In FIG. 6, the ordinate represents the distance between the initial landing point and the other landing point, while the abscissa represents how many time the degaussing method has been used. The curve shown by a solid line interrupted by two dashed lines represents the right bottom corner of the screen. The curve shown by a dashed line represents the left bottom corner of the screen. The curve shown by a solid line represents the upper right corner of the screen. The curve shown by a solid line interrupted by a single dashed line represents the upper left corner of the screen. As can be understood from FIG. 6, the maximum shift distance is 33 $\mu$m and the average shift distance is 11 $\mu$m. Since, as noted above, the remnant magnetism varies in accordance with the phase difference between the degaussing magnetic field and the vertical deflection magnetic field, therefore the distance through which the landing point is shifted varies in accordance with the phase difference.

SUMMARY OF THE INVENTION

The object of the present invention is to provide a method of testing a color cathode ray tube, high in the color purity and suitable for mass production.

According to the present invention, there is provided a method of testing a color cathode ray tube apparatus with a degaussing magnet coil during manufacture of the color cathode ray tube apparatus, which has an initial step of manufacturing the cathode ray tube apparatus including a vacuum envelope having a panel, a funnel and a neck, an electron gun assembly received in the neck, for emitting electron beams, a screen, formed on the panel, for emitting light rays when the electron beams are landed thereon, and a vertical deflection coil and a horizontal deflection located on the vacuum envelope to deflect electron beams in a vertical direction and in the horizontal direction respectively, the degaussing method comprising steps of:

energizing the electron gun assembly to emit the electron beams and supplying a horizontal deflection signal and no vertical deflection signal to the horizontal and vertical deflection coils, respectively, to deflect the electron beams in the horizontal direction so that a line image is displayed on the screen;

locating the degaussing coil in front of the panel and energizing the degaussing coil to generate a degaussing magnetic field having a frequency which is the same as a frequency of a commercial power source and applying the degaussing magnetic field to the color cathode ray tube;

moving the degaussing coil in a direction away from the panel to gradually attenuate the magnetic field applied to the color cathode ray tube;

deenergizing the degaussing coil when the degaussing coil is removed from the panel at a predetermined distance;

supplying the vertical deflection signal to the vertical deflection coil to deflect the electron beams in the vertical direction; and testing a picture quality of the color cathode ray tube while the electron beams are deflected in the vertical and horizontal directions and an image is displaced on the screen.

According to the present invention, the remnant magnetism of those component or members which are made of magnetic material and used for the color cathode ray tube can be sufficiently degaussed.

BRIEF DESCRIPTION OF THE DRAWINGS

FIG. 7 is a vertically sectioned view showing an example of the color cathode ray tube according to the present invention;

FIGS. 8A–8C show a timing diagram of the invention;

DETAILED DESCRIPTION OF THE PREFERRED EMBODIMENT

An embodiment of the present invention will be described with reference to the drawings.

Figure 9:
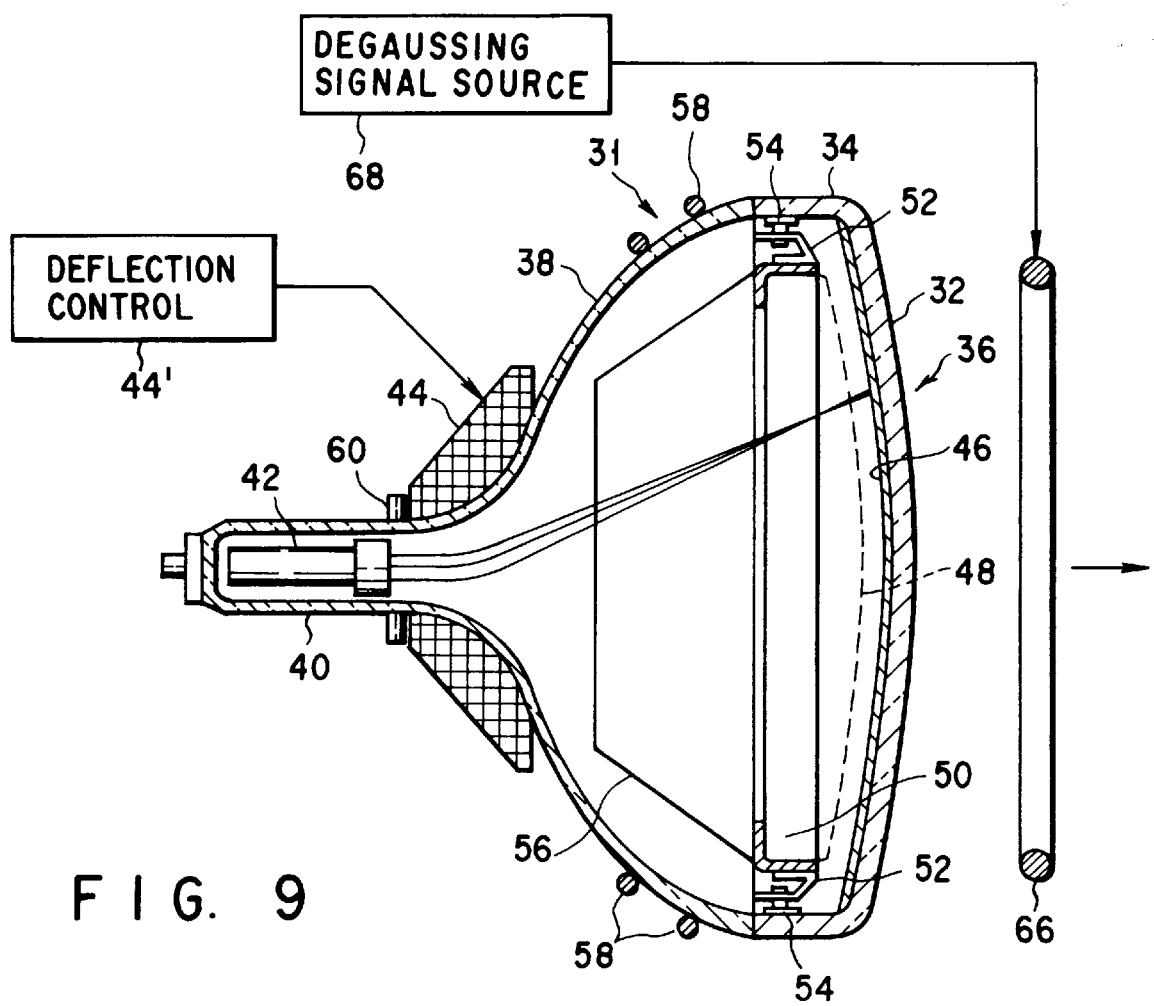
FIG. 9 shows an alternate embodiment of the invention.

FIG. 7 shows an example of the color cathode ray tube according to the present invention. Color cathode ray tube 31 includes panel section 36 provided with is substantially rectangular face plate 32 and skirt 34 projected backward from the rim of face plate 32, funnel section 38 connected to skirt 34 of panel section 36, and neck section 40 continuous from funnel section 38. By panel, funnel and neck sections 36, 38 and 40, the interior of color cathode ray tube 31 is airtightly closed and kept under vacuum. Electron gun assembly 42 for emitting three electron beams is housed in neck section 40. Deflection yoke 44 for generating deflecting magnetic field is provided on the outer face of funnel and neck sections 38 and 40 and controlled by control circuit 44'. Degaussing coil 58 for degaussing magnetic field is located on the outer face of funnel section 38. Degaussing signal source 59 for generating degaussing signal is connected to degaussing coil 58. Degaussing coil and signal source 58 and 59 are also shown in FIG. 9. Magnet 60 for adjusting the color purity is arranged on the outer face of neck section 40. Phosphor screen 46 is formed on the inner face of face plate 32 at panel section 36. Phosphor screen 46 has three kinds of fluorescent layers which are alternately arranged side by side like stripes. When these fluorescent layers are shot by three electron beams, they emit light rays of three colors red, green and blue. Rectangular shadow mask 48 facing phosphor screen 46 is arranged in tube 31. Shadow mask 48 is made by a thin metal plate and has a plurality of slits. Shadow mask 48 serves to land the three electron beams emitted from electron gun assembly 42 onto their corresponding fluorescent layers. Mask frame 50 made of metal is arranged around shadow mask 48. Plural elastic supports 52 are welded to mask frame 50. Plural panel pins 54 which are engaged with supports 52 are arranged on the inner face of skirt 34. Internal magnetic shield 56 is provided on that side of frame 50 which is located closer to neck 40, such that the electron beams emitted from electron gun assembly 42 are not under the influence of a magnetic field, for example the earth magnetism.

The degaussing method used in the present invention will now be described. The power source for the color cathode ray tube apparatus is switched on, at time $t_1$, shown in FIG. 8A. FIG. 8B shows that no vertical deflecting current is supplied to the deflection yoke 44 at this time. The degaussing signal source 59 is switched on at first at time $t_2$, close to $t_1$, as shown in FIG. 8C, and a degaussing signal is supplied from degaussing signal source 59 to degaussing coil 58. The degaussing signal, i.e., a degaussing current has a frequency the same as that of the commercial power source and is gradually attenuated. No vertically deflecting current is supplied at this time $t_2$ to the vertically deflecting coil of deflection yoke 44. Thus, only a line image is displayed on the cathode ray tube. Magnetized components of tube 31 can be efficiently degaussed because a degaussing signal having the same frequency as that of the commercial power source, for example, 50 Hz, is supplied to degaussing coil 58. The supply of degaussing signal to degaussing coil 58 is then stopped at time $t_3$. A few moments, i.e., 5 to 6 seconds after, a vertically deflecting current is supplied to the deflection yoke 44 at time $t_4$. Phosphor screen 46 and shadow mask 48 are thus scanned with electron beams and an image is displayed on face plate 32. The electron beams can be landed correctly onto phosphor screen 46 because components made of magnetic material such as shadow mask 48 are sufficiently degaussed. As the result, the picture quality of the color cathode ray tube can be enhanced. Although degaussing coil 58 has been attached to the outer face of funnel section 38 in the case of the above-described example, it may be detachably attached to funnel section 38 so that measurement of colors purity or colors adjustment can be carried out when color cathode ray tube 31 or a television set is completed. The degaussing coil may be attached to the outer face of at least one of panel and funnel sections 36 and 38.

Figure 10A:
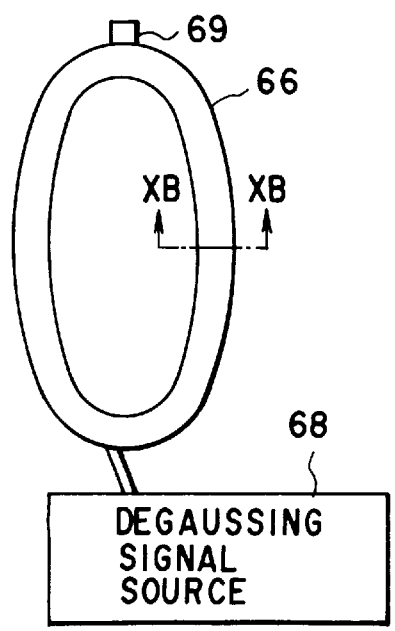
FIG. 10A is a plan showing another example of the degaussing apparatus according to the present invention.
Figure 10B:
FIG. 10B is a sectional view taken along a line 10B—10B in FIG. 10A.

In a manufacturing of a color cathode ray tube, a movable degaussing coil 66 shown in FIGS. 9, 10A and 10B is used to degauss the color cathode ray tube before measurement and adjustment of the color cathode ray tube are carried out. The degaussing coil 66 is generally formed by winding a copper wire into a ring as shown in FIGS. 10A and 10B, and terminals of the degaussing coil 66 are connected to a degaussing signal source 68 for supplying AC power having the same frequency as that of the commercial power, for example, 50 Hz. A switch 69 is provided on the coil 66 for switching the supply of the power. A degaussing method of the color cathode ray tube in the manufacturing steps will be described as follows.

In the degaussing method according to the invention, deflection yoke 44 is attached to the color cathode ray tube as shown in FIG. 9, and the color cathode ray tube is mounted on a testing apparatus for measuring and adjusting the color cathode ray tube and an anode button (not shown), stem pins (not shown) and the deflection yoke 44 of the color cathode ray tube are connected to corresponding terminals of the testing apparatus. In the testing apparatus, a high voltage, i.e. 25 to 35 kV, is applied to an anode button (not shown) provided on the funnel 38, energizing voltages, i.e. a focus voltage of 7 to 11 kV, a ground potential, a cathode voltage of 100 to 200V and a heater voltage of 6.3V, are applied to the electron gun assembly 42, and a horizontal deflection current is supplied to the deflection yoke 44 from terminals of the testing apparatus so that the electron gun assembly 42 is energized to emit electron beams, and a horizontal magnetic field is applied to the electron beams from the deflection yoke 44. Thus, the phosphor screen 46 is scanned by the electron beams along the horizontal axis and a straight line image is displayed on the face plate 32. In this step, no vertical deflection current is applied to the deflection yoke and the electron beams are not deflected in the vertical direction. Thus, the straight line image is fixed on the panel.

Figure 1:
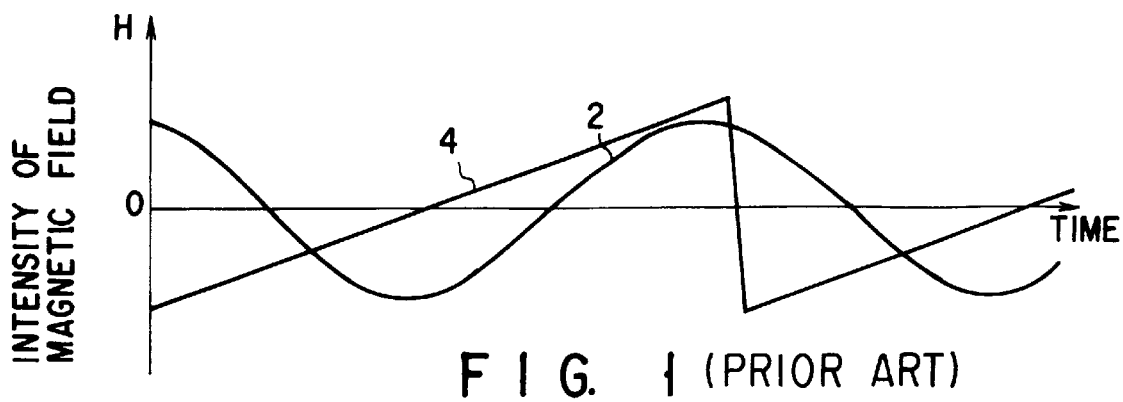
FIG. 1 is a graph showing how the degaussing magnetic field and the vertical deflection magnetic field are generated in a conventional color cathode ray tube.
Figure 2:
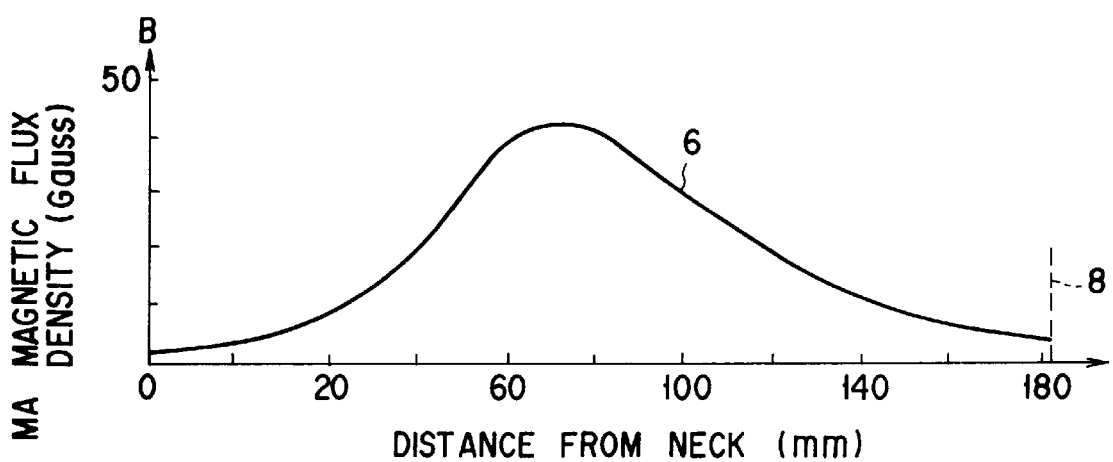
FIG. 2 is a graph showing how magnetic flux density of a vertical deflection are distributed in the conventional color cathode ray tube.
Figure 3:
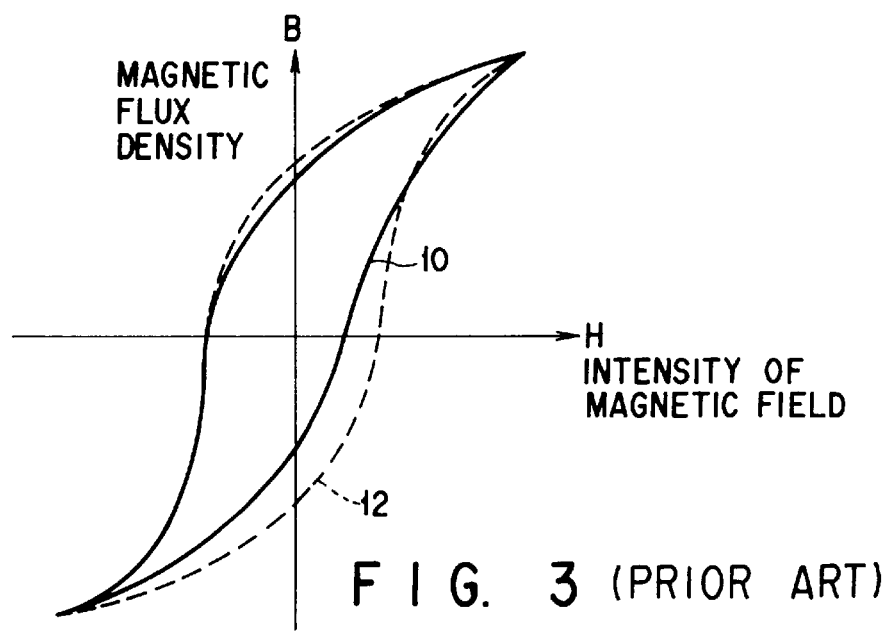
FIG. 3 shows a hysteresis loop relating to a conventional internal magnetic shield.
Figure 4:
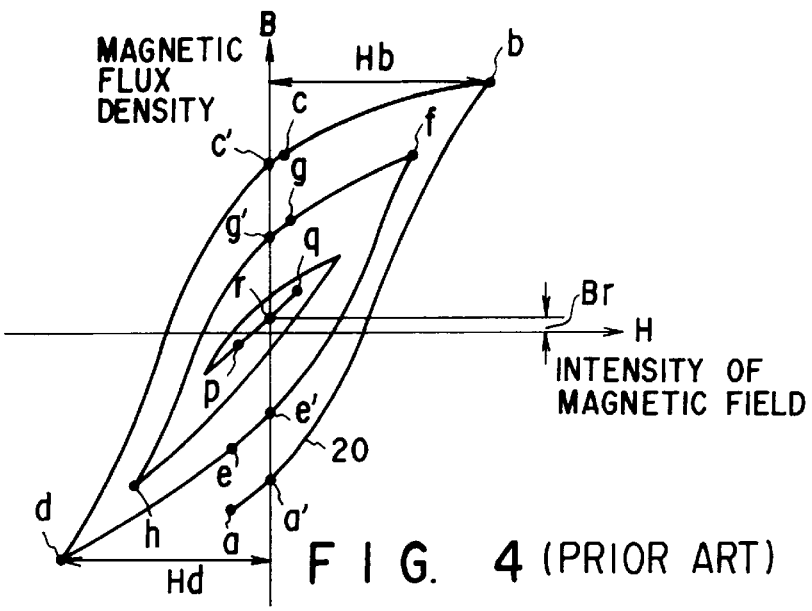
FIG. 4 shows a hysteresis curve obtained when the conventional color cathode ray tube is degaussed by use of a conventional method.
Figure 5:
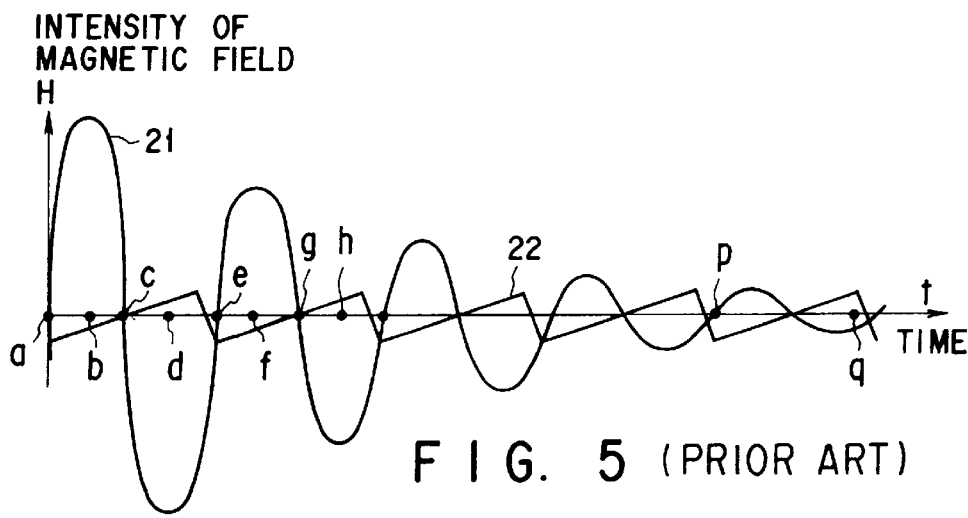
FIG. 5 is a graph showing both the degaussing magnetic field and the vertical deflection magnetic field of the conventional color cathode ray tube.
Figure 6:
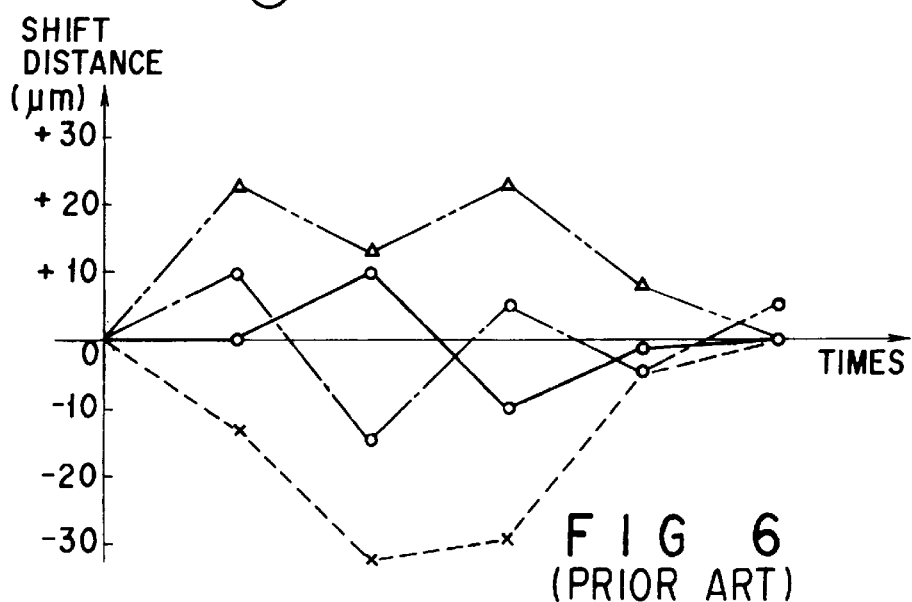
FIG. 6 shows how the landing point of an electron beam is shifted from its initial landing position in the conventional color cathode ray tube.

In this condition, the degaussing coil 66 is located in front of the face plate 32 to start the degaussing process. That is, the power switch 69 is turned on and the degaussing coil 66 is energized to generate an AC magnetic field having commercial frequency which is applied to the cathode ray tube. Thereafter, the degaussing coil 66 is gradually moved in a direction 70 shown in FIG. 9 so that the AC magnetic field applied to the color cathode ray tube is gradually attenuated. The degaussing coil 66 is deenergized by switching off the switch 69, when the degaussing coil is so sufficiently removed from the face plate 32 that the magnetic field generated from the degaussing coil scarcely affects the color cathode ray tube, or does not magnetize parts of the color cathode ray tube. This distance between the degaussing coil 66 and the face plate 32 is generally more than 2 m. A few moments, i.e., 5 to 6 seconds after switching off the switch 69, the vertical deflecting signal 2 shown in FIG. 1 is supplied to the deflection yoke 44 and the image is displayed on the face plate 32. Thus, the color purity of the cathode ray tube is measured and is adjusted by the testing apparatus.

In the degaussing process described above, the energizing of the degaussing coil 66 is started after the line image is displayed. However, the line image may be displayed after the degaussing coil 66 is energized and the degaussing coil 66 is moved after the line image is displayed. The degaussing coil 58 connected to the degaussing signal source 59 may be provided on the tube as shown in FIG. 7 and may be energized in such a manner that a magnetic field is generated from the coil 58 and attenuated at the same time as that of the degaussing coil 66 as described above with reference to FIGS. 8A to 8C.

In the degaussing process, magnetic parts of the color cathode ray tube such as shadow mask, frame, inner shield and so on are magnetized by a magnetic field generated from the electron beams emitted from the electron gun assembly 42. However, during this process, this magnetization of the parts can be demagnetized by the magnetic field which is generated from the degaussing coil 66 after the emission of the electron beams. This enables the electron beams to be landed correctly onto phosphor screen 46. The picture quality of the color cathode ray tube can be enhanced accordingly.

Although the degaussing method has been described relating to the color cathode ray tube provided with the inner magnetic shield and the shadow mask, it may be applied to the color cathode ray tube including no inner magnetic shield. It may be applied to all of image tubes which include magnetic material at that area where a deflecting magnetic field is applied.

According to the present invention, the electron beams can be prevented from mistakenly landing onto the phosphor screen because the remnant magnetism of tube components can be degaussed. This enables the amount of the electron beams mistakenly landed onto the phosphor screen to be precisely measured without any influence of the remnant magnetism in the tests of picture quality and the like conducted in the course of manufacturing color cathode ray tubes. It can be therefore precisely found whether or not the picture quality of the color cathode ray tube is excellent.

According to the present invention, the remnant magnetism in the color cathode ray tube can be sufficiently demagnetized so that the picture quality of the tube can be improved. As the result, a color cathode ray tube, having a good quality can be provided.

What is claimed is:

1. A method of testing a color cathode ray tube apparatus with a degaussing magnetic coil during manufacture of the color cathode ray tube apparatus, which has an initial step of manufacturing the cathode ray tube apparatus including a vacuum envelope having a panel, a funnel and a neck, an electron gun assembly received in the neck, for emitting electron beams, a screen, formed on an inner surface of the panel, for emitting light rays when the electron beams are landed thereon, and a vertical deflection coil and a horizontal deflection coil located on the vacuum envelope to deflect the electron beams in a vertical direction and in a horizontal direction respectively, the method comprising steps of:

energizing the electron gun assembly to emit the electron beams and supplying a horizontal deflection signal to the horizontal deflection coil and no vertical deflection signal to the vertical deflection coil to deflect the electron beams in the horizontal direction so that a line on the screen is scanned by the electron beams;

locating the degaussing magnetic coil in front of the panel and energizing the degaussing magnetic coil to generate a degaussing magnetic field having a frequency being a same frequency as a commercial power source and applying the degaussing magnetic field to the color cathode ray tube;

moving the degaussing magnetic coil in a direction away from the panel to gradually attenuate the degaussing magnetic field applied to the color cathode ray tube;

deenergizing the degaussing magnetic coil when the degaussing magnetic coil is removed from the panel at a predetermined distance;

supplying the vertical deflection signal to the vertical deflection coil to deflect the electron beams in the vertical direction; and testing a picture quality of the color cathode ray tube while the electron beams are deflected in the vertical and the horizontal directions and an image is displayed on the screen.

2. A method according to claim 1, wherein the energizing step includes detachably providing the horizontal deflection coil and the vertical deflection coil on the vacuum envelope.

3. A method according to claim 1, wherein the energizing step includes connecting the electron gun assembly to a power supply.

* * * * *